United States Patent [19]
Backlin

[11] 4,369,980
[45] Jan. 25, 1983

[54] FIRE RING FOR CYLINDER HEAD GASKET

[75] Inventor: Robert R. Backlin, Crete, Ill.

[73] Assignee: Allis-Chalmers Corporation, Milwaukee, Wis.

[21] Appl. No.: 309,235

[22] Filed: Oct. 7, 1981

[51] Int. Cl.³ .............................................. F16J 15/12
[52] U.S. Cl. ................................. 277/235 B; 277/180; 277/236
[58] Field of Search ........... 277/235 R, 235 A, 235 B, 277/236, 180, 166, 178, 189

[56] References Cited

U.S. PATENT DOCUMENTS

| 3,473,813 | 10/1969 | Meyers et al. | 277/180 |
| 3,560,007 | 2/1971 | Ascencio | 277/235 B |
| 4,026,565 | 5/1977 | Jelinek | 277/180 |

FOREIGN PATENT DOCUMENTS 587720  1/1959  Italy ..................... 277/180

Primary Examiner—Robert S. Ward, Jr.
Attorney, Agent, or Firm—Arthur L. Nelson

[57] ABSTRACT

A cylinder head gasket for an internal combustion engine having double metal wrapped hoops providing a reinforced fire ring around the combustion chamber. The inner hoop is the larger hoop to carry the clamping load and form a positive seal while the outer hoop reinforces the inner hoop.

10 Claims, 4 Drawing Figures

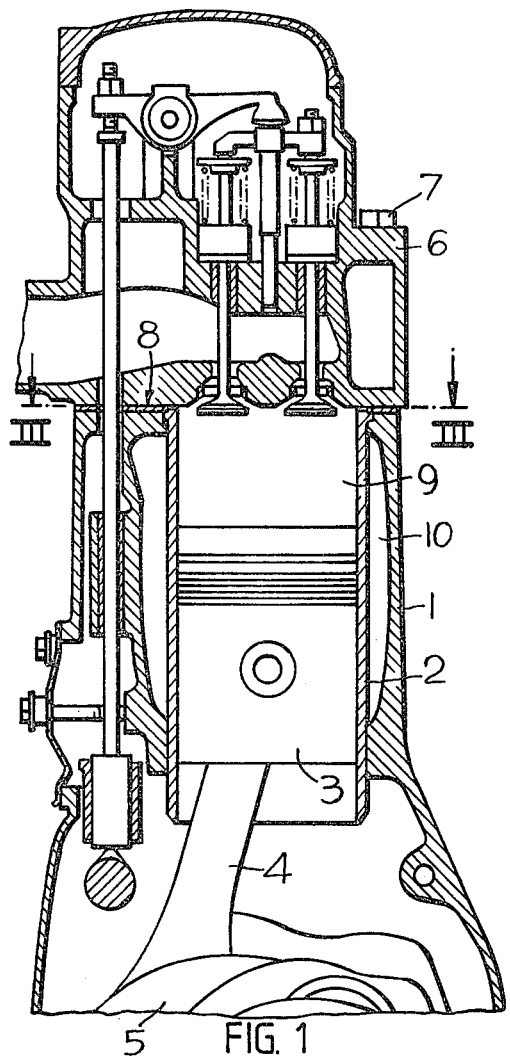
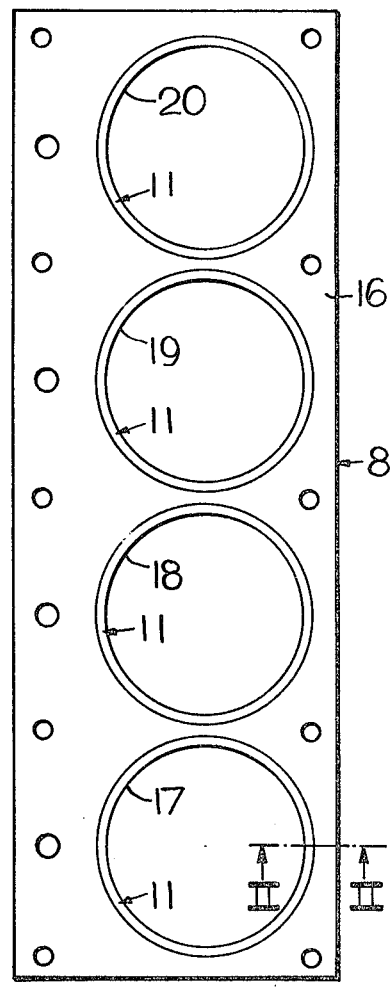
FIG. 1
FIG. 3
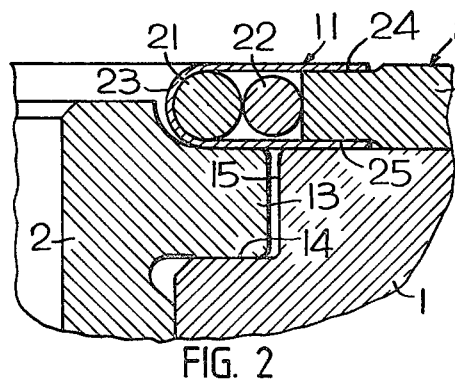
FIG. 2
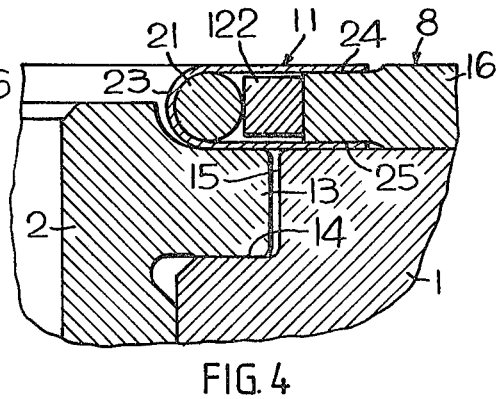
FIG. 4

FIRE RING FOR CYLINDER HEAD GASKET

This invention relates to an internal combustion engine and more particularly to a cylinder head gasket having metal wrapped double wire rings forming the fire ring around the cylinder opening and the combustion chamber of an internal combustion engine.

Cylinder head gaskets for an internal combustion engine are normally provided with fire rings around the cylinder opening and the combustion chamber to seal the hot gases from the coolant for cooling the internal combustion engine. The high compression of diesel engines increases the heat and pressure which the gaskets are subjected to and increases the strain. The fire rings are generally metal and wrapped in metal to withstand heat and pressure. The Baugh et al patent, U.S. Pat. No. 4,244,330, and the Meyers et al patent, U.S. Pat. No. 3,473,813, illustrate cylinder head gaskets. The Meyers et al patent shows an non-ferrous material forming the gasket material around the cylinder opening on a diesel engine while the Baugh et al patent shows a single metal hoop wrapped in metal to provide a fire ring on the gasket. A single fire ring, as illustrated in the Baugh et al patent, has been known to operate satisfactorily under ideal conditions with adequate clamp down forces around the fire ring on the gasket. The heat and pressure and changing temperatures can cause deterioration of the gaskets which will in time reduce the sealing qualities of the gasket necessitating retorquing of the cylinder head bolts to restore its sealing quality. Since it is not always known when deterioration of the seal is present, the deterioration may progress to a point where the gasket blows out requiring replacement.

The applicant has provided for a reinforced fire ring to withstand the high heat and pressures of the modern diesel engine. A double hoop increases the structural integrity of the fire ring and increases the fire ring strength. A larger inner hoop carries the load and forms a seal between the head and the cylinder sleeve while the smaller outer hoop reinforces the inner hoop and provides greater fire ring strength.

It is an object of this invention to provide a cylinder head gasket with greater fire ring strength.

It is another object of this invention to provide a cylinder head gasket for an internal combustion engine having double hoops forming the fire ring to increase the strength of the fire ring to reduce gasket blowout.

It is a further object of this invention to provide a cylinder head gasket having a metal wrapped double hoop to form the fire ring. The inner hoop is of a larger diameter to carry the clamp down load and form a positive seal between the head and the sleeve. The outer smaller hoop gives added strength to the fire ring to assure seal integrity and prevent blowout.

The objects of this invention are accomplished in a cylinder head gasket for an internal combustion engine. The fire ring has a double hoop with a metal wrap to form seal integrity around the combustion chamber. The inner larger hoop carries the clamping load to provide a positive seal while the outer smaller hoop increases the hoop strength and provides greater structural integrity to maintain a more durable fire ring and insure against blowout of the cylinder head gasket.

Referring to the drawings, a preferred embodiment of this invention is illustrated.

FIG. 1 illustrates a cross-section view of an internal combustion engine showing the cylinder head gasket in the engine;

FIG. 2 is a cross-section view of the cylinder head gasket with the double hoop, metal wrapped fire ring;

FIG. 3 illustrates the cylinder head gasket; and

FIG. 4 is a modification of the cylinder head gasket shown in FIG. 2.

Referring to the drawings, FIG. 1 illustrates a cross-section of the engine. The engine block 1 receives the cylinder sleeve 2 to form the cylinder receiving the piston 3. Piston 3 is pivotally connected to the crankshaft 5 through the connecting rod 4. The engine head 6 is fastened by means of a plurality of bolts 7. The gasket 8 forms a gas seal between the combustion chamber 9 and the coolant chambers 10 cooling the engine. The gasket 8 is compressively positioned between the head 6, the block 1 and sleeve 2 to form a seal between the hot gases in the combustion chamber 9 and the coolant chamber 10.

Referring to FIGS. 2 and 3, the gasket is shown. FIG. 3 shows a plan view of the cylinder head gasket 8 and FIG. 2 shows a cross-section view taken on line II—II of FIG. 3. Block 1 is formed with a bore to receive the sleeve 2. The sleeve is formed with a flange 13 which seats on radial facing 14 formed by the counterbored portion 15 of the block 1. The gasket 8 is positioned between the cylinder head 6, the sleeve 2 and the block 1. Gasket 8 includes the body 16 formed with cylinder openings 17, 18, 19 and 20 having fire rings 11. The fire rings consist of a sealing hoop 21 which is slightly larger than the reinforcing hoop 22. The hoops 21, 22 are encased in a metal wrap 23 which is pressed against the surfaces 24 and 25 of the gasket body. Sealing ring 21 forms a seal as it is compressed between the head 6 and the sleeve 2. Since the reinforcing hoop 22 is slightly smaller than hoop 21, it does not form a seal per se but reinforces the hoop 21 when the cylinder head bolts 7 are torqued at the proper tension. FIG. 4 shows a square reinforcing ring 122. The gasket 8 forms a positive seal between the combustion chamber 9 and the coolant passages.

The embodiments of the invention in which an exclusive property or privilege is claimed are defined as follows:

1. An internal combustion engine having a cylinder head gasket comprising, a cylinder block defining at least one bore, a cylinder sleeve received in said bore, a cylinder head, a cylinder head gasket compressively positioned between said cylinder head and said block and sleeve to form a seal, said gasket including a body defining a cylinder opening, a fire ring received in said opening including a radially inner sealing hoop compressively deformed to form a seal between said cylinder head and said cylinder sleeve, a radially outer and reinforcing hoop disposed between said sealing hoop and the body of said gasket pressing radially inward against said inner sealing hoop, a metal wrap enclosing said hoops and fastened to the body of said gasket and compressively sealed with said cylinder head and cylinder block to thereby provide a sealing gasket assembly.

2. An internal combustion engine having a cylinder head gasket as set forth in claim 1 wherein the sealing hoop defines a slightly greater thickness than the reinforcing hoop.

3. An internal combustion engine having a cylinder head gasket as set forth in claim 1 wherein said block defines the bore and a counterbore, said sleeve defines a flange received in the counterbore of said block.

4. An internal combustion engine having a cylinder head gasket as set forth in claim 1 wherein said sealing hoop compressively seals between said block and said sleeve to form a fluid-tight seal in said engine.

5. An internal combustion engine having a cylinder head gasket as set forth in claim 1 wherein said reinforcing hoop defines a lesser thickness than said sealing hoop to reinforce said sealing hoop and provide structural integrity of the fire ring.

6. An internal combustion engine having a cylinder head gasket as set forth in claim 1 wherein said hoops define steel hoops.

7. An internal combustion engine having a cylinder head gasket as set forth in claim 1 wherein said sleeve defines a fire shield extending radially inward of said gasket.

8. An internal combustion engine having a cylinder head gasket as set forth in claim 1 wherein at least one of said hoops defines a round cross-sectional configuration.

9. An internal combustion engine having a cylinder head gasket as set forth in claim 1 wherein at least one of said hoops defines a rectangular cross-sectional configuration.

10. An internal combustion engine having a cylinder head gasket as set forth in claim 1 wherein said metal wrap encloses said hoops and overlays a portion of the body of said gasket and engages the upper and lower surfaces of said gasket.

* * * * *